United States Patent
Fioravanti

(10) Patent No.: US 7,717,499 B2
(45) Date of Patent: May 18, 2010

(54) SUPPORTING STRUCTURAL ELEMENT FOR A MOTOR VEHICLE WITH A CENTRALLY POSITIONED ENGINE

(75) Inventor: Leonardo Fioravanti, Moncalieri (IT)

(73) Assignee: Fioravanti SRL, Turin (IT)

( * ) Notice: Subject to any disclaimer, the term of this patent is extended or adjusted under 35 U.S.C. 154(b) by 549 days.

(21) Appl. No.: 11/573,497

(22) PCT Filed: Aug. 3, 2005

(86) PCT No.: PCT/EP2005/053810

§ 371 (c)(1),
(2), (4) Date: Feb. 9, 2007

(87) PCT Pub. No.: WO2006/015967

PCT Pub. Date: Feb. 16, 2006

(65) Prior Publication Data

US 2007/0252413 A1    Nov. 1, 2007

(30) Foreign Application Priority Data

Aug. 12, 2004 (IT) .................. TO20040109 U

(51) Int. Cl.
*B62D 31/00* (2006.01)
(52) U.S. Cl. .................. 296/203.04; 296/193.05; 296/37.8; 296/37.16
(58) Field of Classification Search ............ 296/193.07, 296/193.05, 193.08, 203.01, 203.03, 203.04, 296/37.15, 37.16, 63, 64, 37.8
See application file for complete search history.

(56) References Cited

U.S. PATENT DOCUMENTS 3,632,157 A    1/1972    Lohr
4,216,839 A  *  8/1980   Gould et al. ............... 180/65.1
4,657,297 A  *  4/1987   Ishibashi ..................... 296/63
5,201,547 A  *  4/1993   Ogawa et al. ............... 280/834
6,039,350 A  *  3/2000   Patzelt et al. ................ 280/775
6,065,795 A      5/2000   Forster et al.
6,328,365 B1 * 12/2001   Adsit ........................ 296/37.6

(Continued)

FOREIGN PATENT DOCUMENTS

EP    1 375 310 A2    3/2003

(Continued)

*Primary Examiner*—Glenn Dayoan
*Assistant Examiner*—Gregory Blankenship
(74) *Attorney, Agent, or Firm*—Sughrue Mion, PLLC

(57) ABSTRACT

The supporting structural element (1) comprises a shaped rigid body (2) in which are formed: two transversely adjacent cellular formations (3), intended to receive corresponding padding means (4, 5) to form seats; each of the said cellular formations (3) has a seat portion (3a) and a backrest portion (3b); an intermediate formation (6) shaped like an inverted channel, which interconnects the seat portions (3a) of the aforesaid cellular formations (3), forming a tunnel (7); a horizontal or virtually horizontal upper planar formation (9), which interconnects the upper backrest portions (3b) of the cellular formations (3), and a rear formation (10), essentially in the shape of a dihedral, with a first wing or skirt (10a) which is substantially horizontal and extends behind the seat portions (3a) of the cellular formations (3), and with a second wing or skirt (10b) which extends between the upper planar formation (9) and the said first wing or skirt (10a), behind and distant from the backrest portions (3b) of the cellular formations (3) such that a compartment or receptacle (11) is formed.

8 Claims, 5 Drawing Sheets

U.S. PATENT DOCUMENTS

| | | | |
|---|---|---|---|
| 6,389,927 B1 * | 5/2002 | Willemsen | 74/514 |
| 6,883,857 B2 * | 4/2005 | Steinhauser et al. | 296/181.2 |
| 7,008,006 B2 * | 3/2006 | Steinhauser et al. | 296/181.2 |
| 2004/0070233 A1 * | 4/2004 | Steinhauser et al. | 296/193.01 |

FOREIGN PATENT DOCUMENTS

GB  533 579  2/1941

* cited by examiner

SUPPORTING STRUCTURAL ELEMENT FOR A MOTOR VEHICLE WITH A CENTRALLY POSITIONED ENGINE

The present invention relates to an innovative supporting structural element for a motor vehicle provided with a centrally positioned internal combustion engine.

The supporting structural element according to the invention essentially comprises a shaped rigid body, in which are formed:

two transversely adjacent cellular formations, the bottoms of which can be closed if necessary, intended to receive corresponding padding means to form seats for the driver and a passenger, and each having a seat portion and a backrest portion;

an intermediate formation shaped like an inverted channel, the bottom of which can be closed if necessary, which interconnects the seat portions of the said cellular formations, forming a tunnel through which mechanical transmission members can pass, a substantially horizontal upper planar formation, which interconnects the upper backrest portions of the cellular formations, and a rear formation, essentially in the shape of a dihedral, with a first wing or skirt which is substantially horizontal and extends behind the seat portions of the cellular formations, and with a second wing or skirt which extends between the upper planar formation and the said first wing or skirt, behind and distant from the backrest portions of the cellular formations;

the arrangement being such that a usable compartment or receptacle is formed between the upper planar formation, the backrest portions of the cellular formations and the rear formation, and extends transversely behind the said cellular formations.

According to a further characteristic, the aforesaid shaped rigid body has at its top at least one reinforcing formation protruding upwards with respect to the aforesaid seats, in the form of a roll bar.

The aforesaid compartment or receptacle is conveniently open at one or both of its ends facing the sides of the motor vehicle, and can receive transportable objects such as suitcases and the like.

In one embodiment, air/liquid heat exchangers (radiators), with associated air ducts, are conveniently connected to respective opposite sides of the aforesaid rear formation of the shaped body for cooling the internal combustion engine. In this case, the aforesaid compartment or receptacle is at least partly usable for housing a fuel tank.

Further characteristics and advantages of the invention will be made clear by the following detailed description, provided purely by way of example and without restrictive intent, with reference to the attached drawings, in which.

With reference to the drawings, and in particular to FIGS. 1 to 4, in a first embodiment a supporting structural element 1 according to the invention comprises a shaped rigid body indicated as a whole by the number 2. This shaped body is made, for example, from metal, particularly aluminum, or from carbon or a high-strength composite material.

Figure 2:
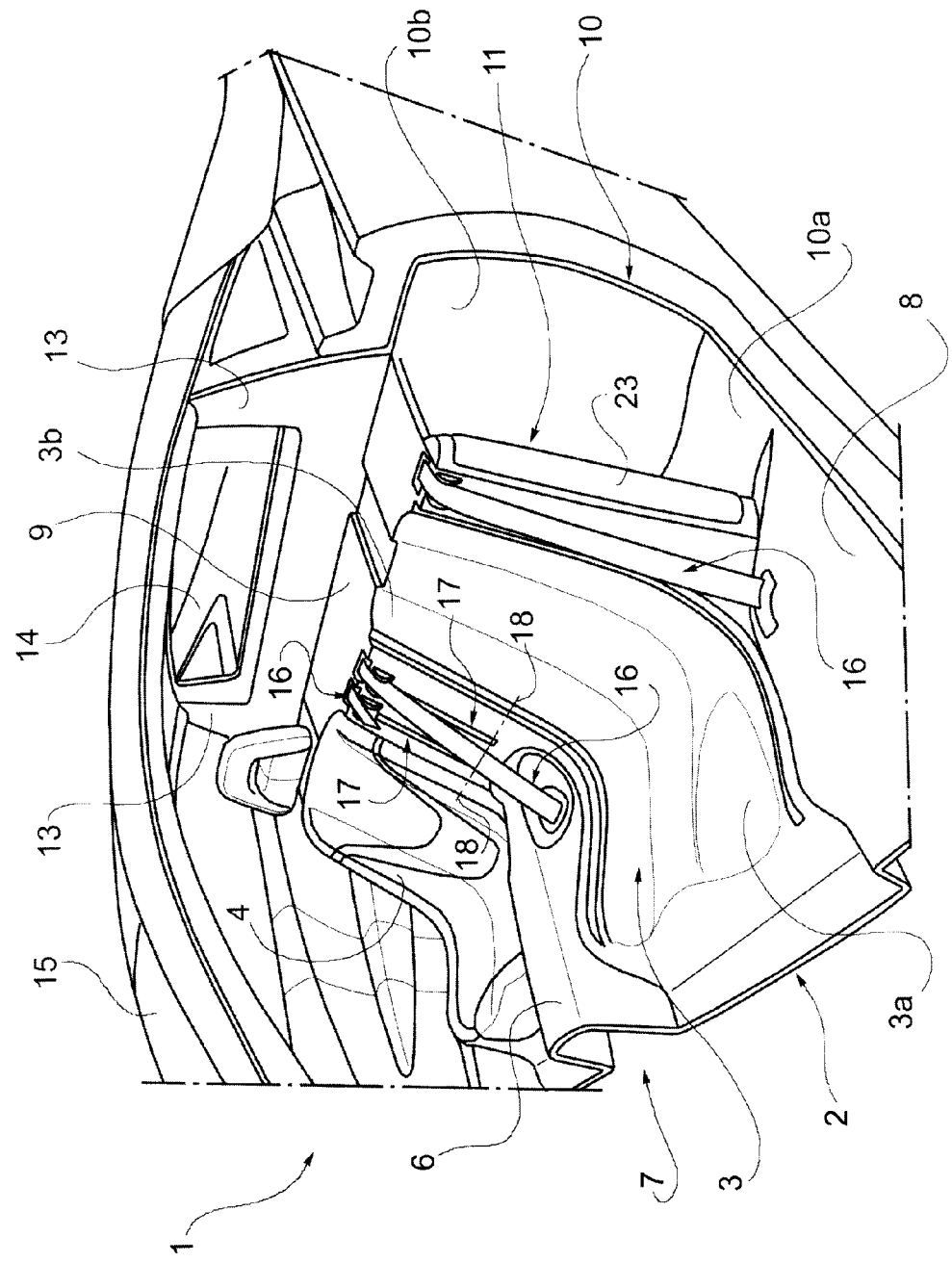
FIG. 2 is a perspective view similar to that of FIG. 1, and shows the supporting structural element of FIG. 1 provided with some accessory devices.
Figure 3:
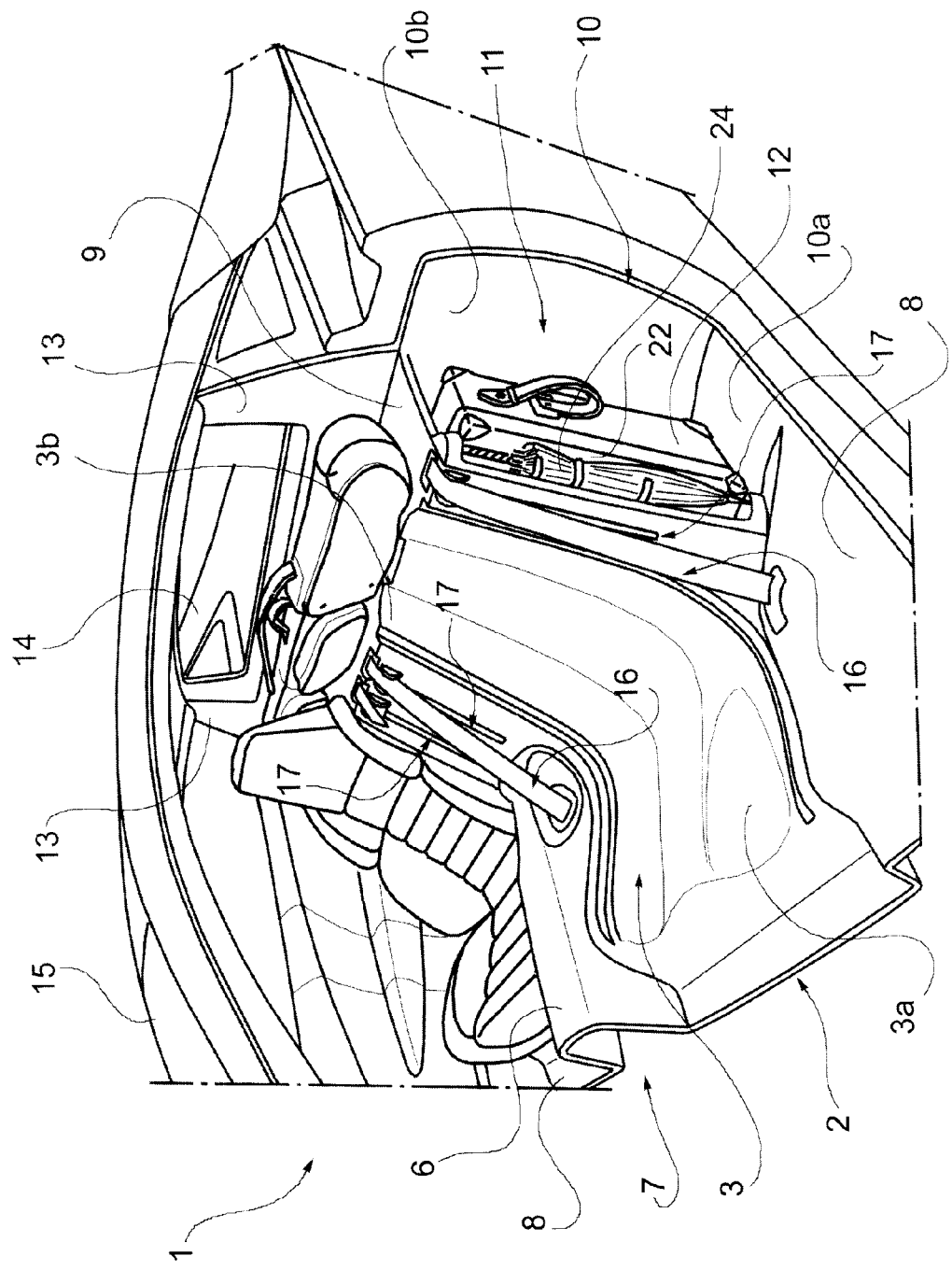
FIG. 3 is a perspective view similar to that shown in FIG. 2.

In the embodiment shown by way of example, the shaped body 2 has two transversely adjacent cellular formations 3, intended to receive corresponding padded structures, such as those indicated by 4 and 5 in FIGS. 2 and 3, to form seats for the driver of the motor vehicle and a passenger.

Figure 1:
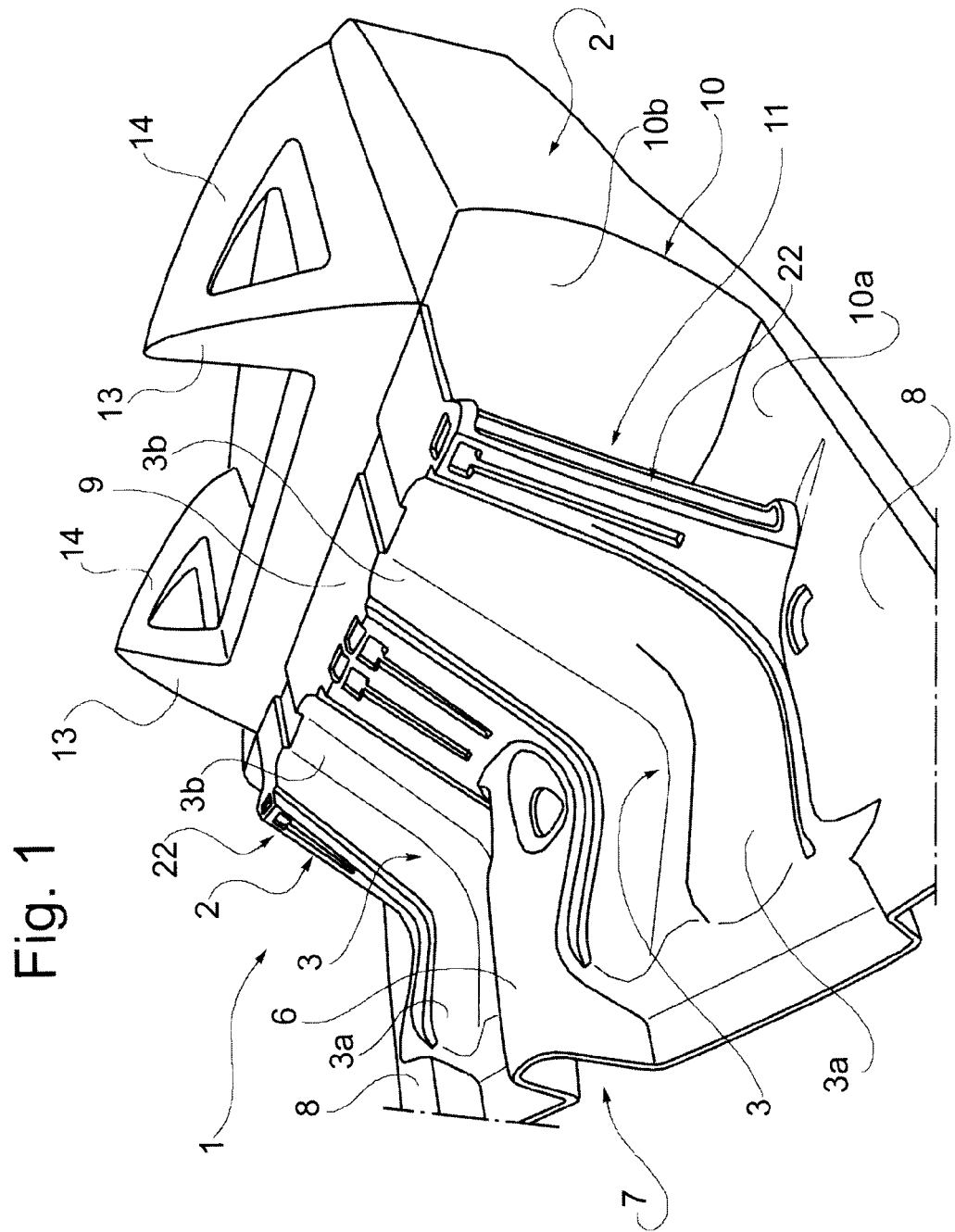
FIG. 1 is a partial perspective view of a supporting structural element according to the present invention.

With reference to FIG. 1 in particular, each of the cellular formations 3 has a seat portion 3a and a backrest portion 3b.

Figure 4:
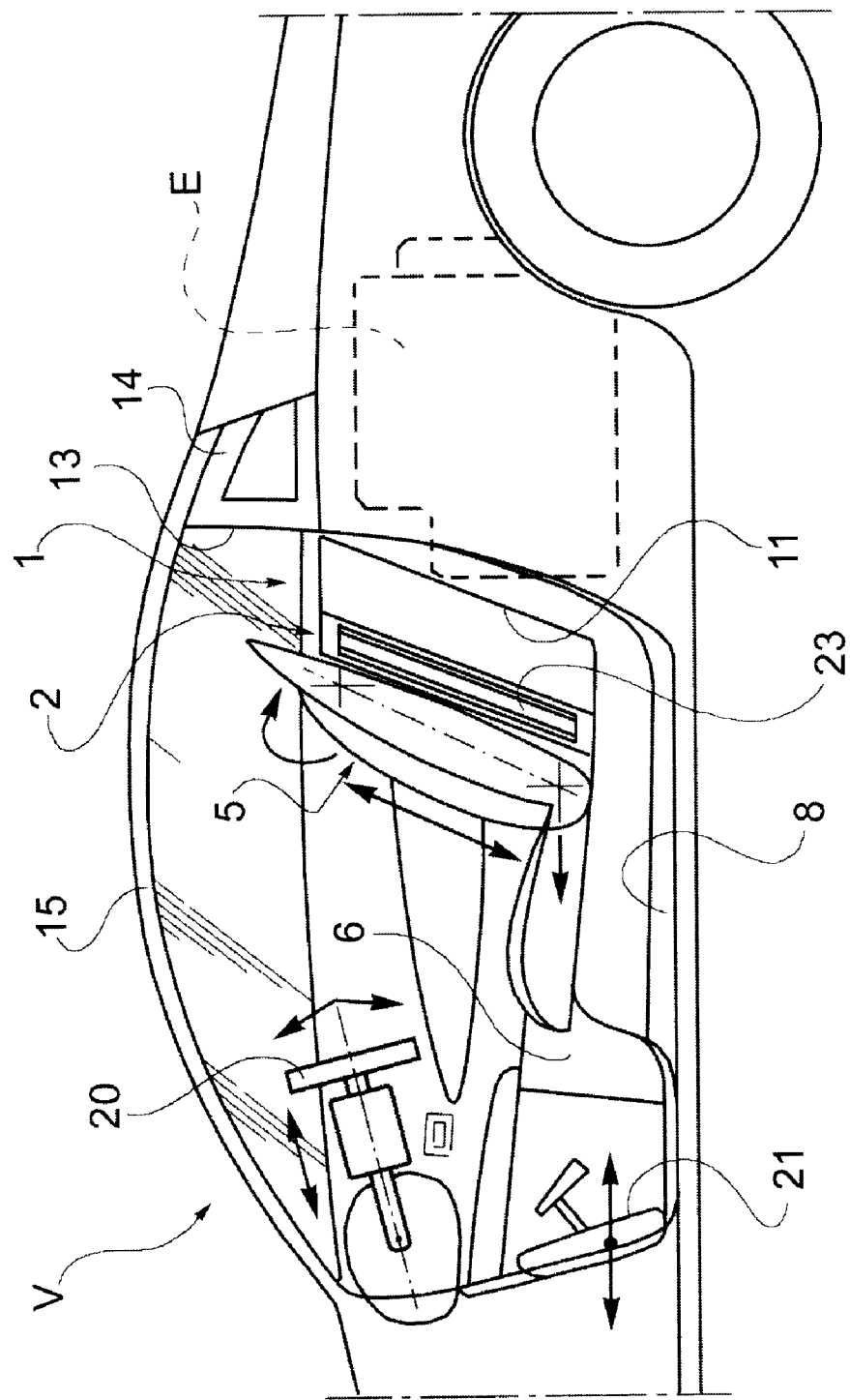
FIG. 4 is a partial schematic illustration in the form of a side view of a motor vehicle provided with a supporting structural element according to the invention.

The two cellular formations 3 are interconnected by an intermediate formation 6 shaped like an inverted channel, the bottom of which can be closed if necessary, which forms a tunnel 7 through which mechanical transmission members can pass and which can also act as an air duct if required for cooling the engine (shown schematically and indicated by E in FIG. 4).

The shaped rigid body 2 also has two lateral formations or base skirts 8, which extend approximately horizontally from the outer sides of the seat portions 3a of the cellular formations 3, to link to door sills of the motor vehicle body.

The number 9 indicates a horizontal or virtually horizontal upper planar formation of the shaped body 2, which interconnects the upper parts of the backrest formations 3b of the cellular formations 3.

The shaped body 2 also comprises a rear formation 10, essentially in the form of a dihedral, with a first substantially horizontal wing or skirt 10a which extends behind the seat portions 3a of the cellular formations and is connected to the lateral formations or base skirts 8. This dihedral rear formation 10 also has a second wing or skirt 10b, which extends between the upper planar formation 9 and the said first wing or skirt 10a, behind and distant from the backrest portions 3b of the cellular formations 3.

As shown in particular in FIGS. 1 to 3, the arrangement is such that a useful compartment or receptacle 11, of substantially parallelepipedal shape, is formed between the upper planar formation 9, the backrest portions 3b of the cellular formations 3 and the rear formation 10, and extends transversely behind the cellular formations 3.

As shown in particular in FIG. 3, the compartment or receptacle 11 is conveniently open at one or both of its ends facing the sides of the motor vehicle, and can receive transportable objects such as suitcases 12 or the like.

With reference to FIG. 1, the shaped rigid body 2 advantageously has reinforcing formations 13 at its top, protruding upwards with respect to the seats (see also FIGS. 2 and 3) and capable of acting as protective elements if the motor vehicle overturns, in the form of what is known as a roll bar.

In the illustrated embodiment, the upwardly projecting formations 13 are joined to inclined rear rails 14, fixed to the said formations 13, to which shaped beams 15 can conveniently be connected (FIGS. 2 to 4) to act both as front uprights and as top rails of the door openings.

With reference to FIG. 1, housings for the passage of safety belts 16 are formed in the shaped body 2, near the cellular formations 3. In the embodiment shown in FIGS. 1 to 3, each seat is associated with two corresponding safety belts 16 (forming what is known as a four-point system) which extend between corresponding pairs of slots provided in the shaped body 2. Conveniently, the belts 16 are associated with corresponding motorizable delivery devices which in the illustrated example comprise corresponding arms 17 which can swing about an axis indicated by 18 in FIG. 2.

With reference to FIG. 4, a motor vehicle V having a centrally positioned engine E, and comprising in its structure or chassis a supporting structural element 1 according to the invention, is conveniently provided with an adjustable steering wheel 20, for example one having what is known as "tilt and telescope" adjustment which allows adjustment of the angle of inclination of the steering column, and allows the steering wheel to be moved towards or away from the driver, as shown schematically by the double arrows in the said figure. The motor vehicle V is also conveniently provided with a pedal assembly 21 whose position is longitudinally adjustable. Thus users of the motor vehicle having different physical statures can easily place the vehicle controls in the positions which are most ergonomically appropriate for them, even though the seats are substantially fixed with respect to the supporting structural element 1 described above.

The following points should be noted in relation to the connection between the padding structures 4 or 5 and the supporting structural element 1.

In a first embodiment, these padding structures can be effectively connected to the cellular formations 3 of the shaped body 2 so that they become fixed, in other words non-adjustable.

Alternatively, by using known electrically powered actuator devices, it is possible to provide a limited range of adjustment of the height of the whole seat above the ground, and if necessary also a range of adjustment of the inclination of at least the backrest part of the padding structure.

In FIG. 4, arrows are shown near the backrest and the seat, to indicate in a general way possible modes of adjustment of their inclination and/or their height. Devices for providing these ranges of adjustment are known, and will therefore not be described further.

In the shaped body 2 of the structural element according to the invention, near the outer sides of the backrest portions 3b of the cellular formations 2, it is conveniently possible to form corresponding vertical compartments or receptacles 22 (FIGS. 1, 3 and 5), provided if necessary with a movable closing element 23 (FIGS. 2 and 4), in which umbrellas 24 can be stowed (FIG. 3).

In a motor vehicle V with a central engine, provided with a supporting structural element according to a first solution of the invention, one or more air/liquid heat exchangers (radiators) for cooling the engine can conveniently be positioned under the bonnet. This solution is possible with the supporting structural element according to the invention described above with reference to FIGS. 1 to 4.

Figure 5:
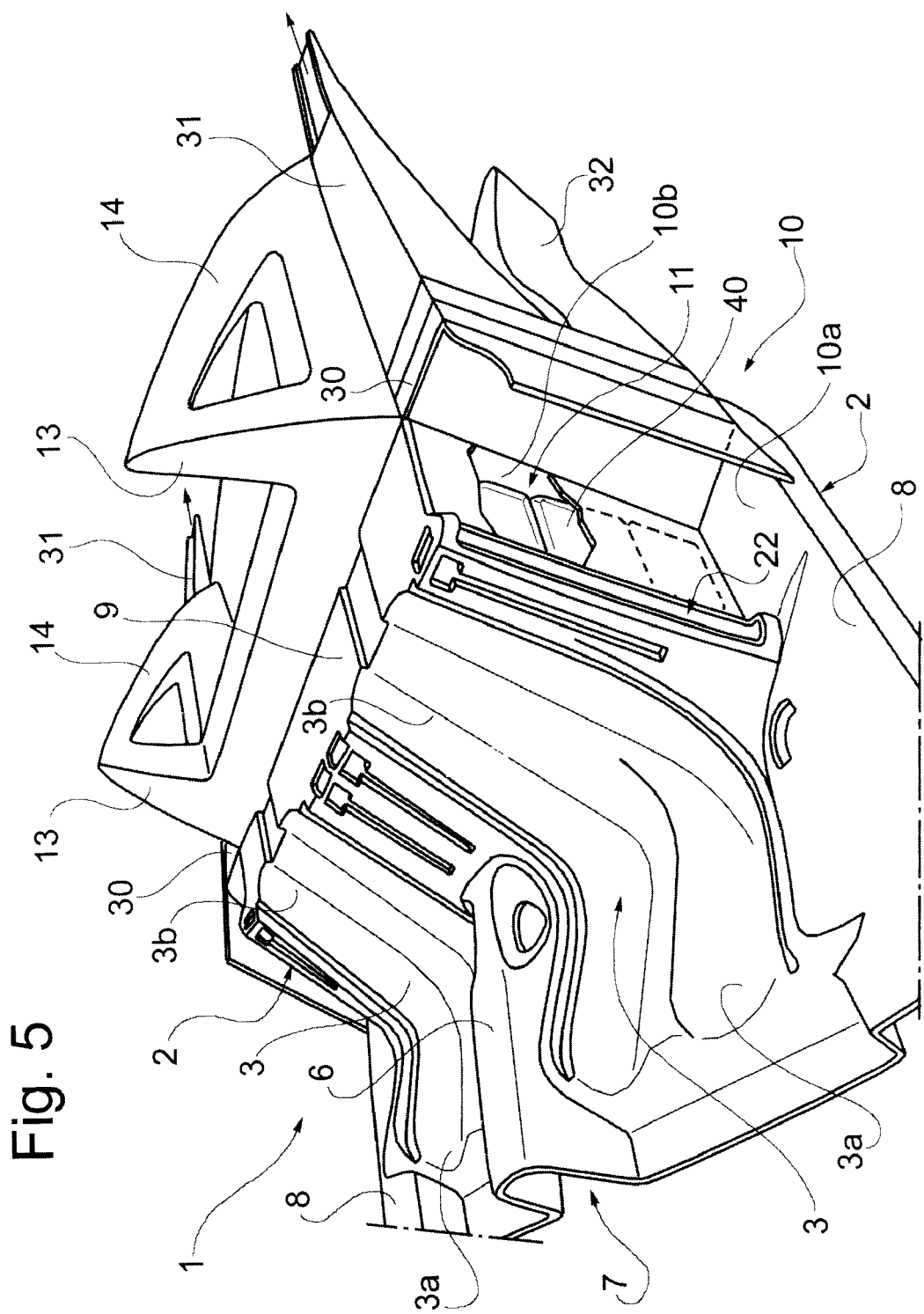
FIG. 5 is a partial perspective view of another supporting structural element according to the invention.

FIG. 5 shows a variant embodiment of the structural element according to the invention, in which corresponding air/liquid heat exchangers (radiators) 30 are connected at the sides of the rear formation 10 of the shaped body 2, together with associated air ducts 31 operating by the chimney effect and air ducts 32 which make use of the low-pressure area due to the ground effect, these ducts being suitably shaped. In this case, during operation the inlet sides of the radiators 30 receive a flow of air guided thereto by suitable intakes and associated guide ducts.

In the embodiment shown in FIG. 5, a compartment or receptacle 11, which can be used conveniently, at least in part, to house a fuel tank 40, is formed in all cases behind the cellular formations 3 and under the upper flat formation 9.

Clearly, provided that the principle of the invention is retained, the forms of application and the details of construction can be varied widely from what has been described and illustrated purely by way of example and without restrictive intent, without thereby departing from the scope of protection of the invention as defined in the attached claims.

The invention claimed is:

1. Supporting structural element (1) for a motor vehicle (V) with a centrally positioned engine (E), and with a two-seat passenger compartment, comprising a shaped rigid body (2) in which are formed:
   two transversely adjacent cellular formations (3), which receive corresponding padding means (4, 5) to form seats for the driver and a passenger, each of the said cellular formations (3) having a seat portion (3a) and a backrest portion (3b);
   an intermediate formation (6) shaped like an inverted channel, the bottom of which being closeable, which interconnects the seat portions (3a) of the cellular formations (3), forming a tunnel (7) through which mechanical transmission members can pass;
   a substantially horizontal upper planar formation (9), which interconnects the upper backrest portions (3b) of the cellular formations (3), and
   a rear formation (10), substantially in the shape of a dihedral, with a first wing or skirt (10a) which is substantially horizontal and extends behind the seat portions (3a) of the cellular formations (3), and with a second wing or skirt (10b) which extends between the upper planar formation (9) and the said first wing or skirt (10a), behind and distant from the backrest portions (3b) of the cellular formations (3);
   the arrangement being such that a compartment or receptacle (11) is formed between the upper planar formation (9), the backrest portions (3b) of the cellular formations (3) and the rear formation (10), and extends transversely behind the said cellular formations (3);
   wherein said compartment or receptacle (11) is open and accessible at least one of its ends facing the sides of the motor vehicle (V), and can receive transportable objects.

2. Structural element according to claim 1, in which the said shaped rigid body (2) also has two lateral formations or base skirts (8) which extend approximately horizontally from the outer sides of the seat portions (3a) of the said cellular formations (3) and from the first wing or skirt (10a) of the said rear formation (10), to connect to the door sills of the vehicle body.

3. Structural element according to claim 1, wherein said shaped rigid body (2) has at its top at least one reinforcing formation (13, 14) protruding upwards with respect to the aforesaid seats (4, 5) in the form of a roll bar.

4. Structural element according to claim 1, wherein housings for the passage of safety belts (16) are formed in the shaped body (2), near the said cellular formations (3).

5. Structural element according to claim 4, wherein motorizable delivery devices (17) associated with the said safety belts (16) are provided in the shaped body (2) near the said cellular formations (13).

6. Supporting structural element according to claim 1, wherein corresponding air/liquid heat exchangers (30) and associated air ducts (31, 32) are connected at opposite sides of the rear formation (10) of the shaped body (11).

7. Structural element according to claim 6, wherein said compartment or receptacle (11) houses a fuel tank (40).

8. Structural element according to claim 2, wherein said shaped rigid body (2) has at its top at least one reinforcing formation (13, 14) protruding upwards with respect to the seats (4, 5) in the form of a roll bar.

* * * * *